United States Patent [19]
Fletcher et al.

[11] 3,939,439
[45] Feb. 17, 1976

[54] DIFFUSED WAVEGUIDING CAPILLARY TUBE WITH DISTRIBUTED FEEDBACK FOR A GAS LASER

[76] Inventors: James C. Fletcher, Administrator of the National Aeronautics and Space Administration, with respect to an invention of Charles Elachi, Pasadena, Calif.

[22] Filed: Dec. 17, 1974

[21] Appl. No.: 533,555

[52] U.S. Cl. .................... 331/94.5 C; 350/96 WG
[51] Int. Cl.² ........................................ H01S 3/08
[58] Field of Search .............. 331/94.5; 350/96 WG

[56] References Cited
UNITED STATES PATENTS
3,772,611   11/1973   Smith .......................... 350/96 WG OTHER PUBLICATIONS
Marcuse, Hollow Dielectric Waveguide For Distributed Feedback Lasers, IEEE J. Quant. Electr., Vol. QE–8, No. 7 (July 1972) pp. 661–669.

*Primary Examiner*—William L. Sikes
*Attorney, Agent, or Firm*—Monte F. Mott; Paul F. McCaul; John R. Manning

[57] ABSTRACT

For use in a waveguide gas laser a capillary tube of glass or ceramic has an inner surface defining a longitudinal capillary opening through which the laser gas flows. At least a portion of the inner surface is corrugated with corrugations or channels with a periodicity $\Lambda$ where $\Lambda = \frac{1}{2}\lambda$, $\lambda$ being the laser gas wavelength. The tube includes a diffused region extending outwardly from the opening. The diffused region of a depth d on the order of $1\lambda$ to $3\lambda$ acts as a waveguide for the waves, with the corrugations producing distributed feedback. The evanescent component of the waves travelling in the diffused region interact with the laser gas in the opening, gaining energy therefrom, and thereby amplifying the waves travelling in the diffused region, which exit the diffused region, surrounding the opening, as a beam of wavelength $\lambda$.

17 Claims, 10 Drawing Figures

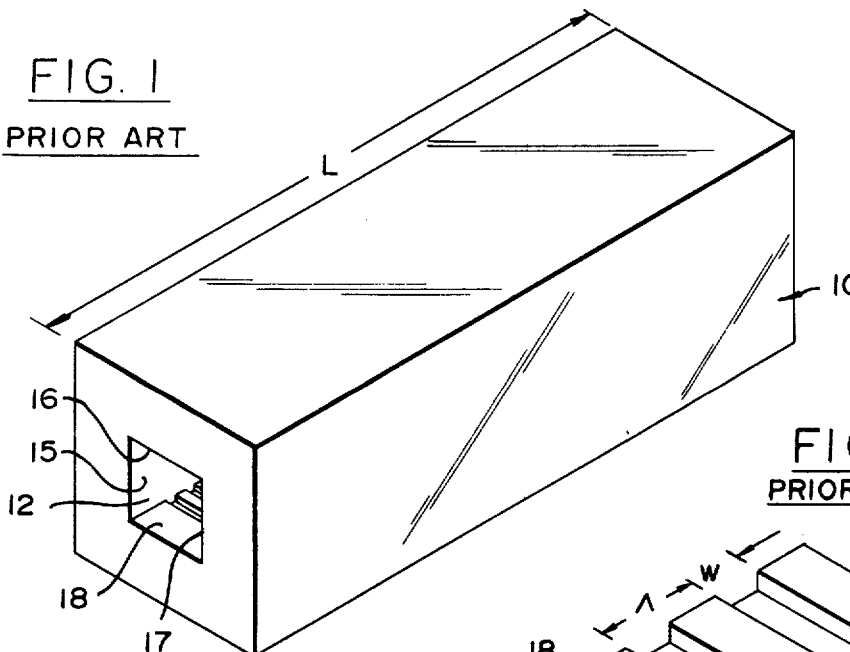
FIG. 1 PRIOR ART
FIG. 2 PRIOR ART
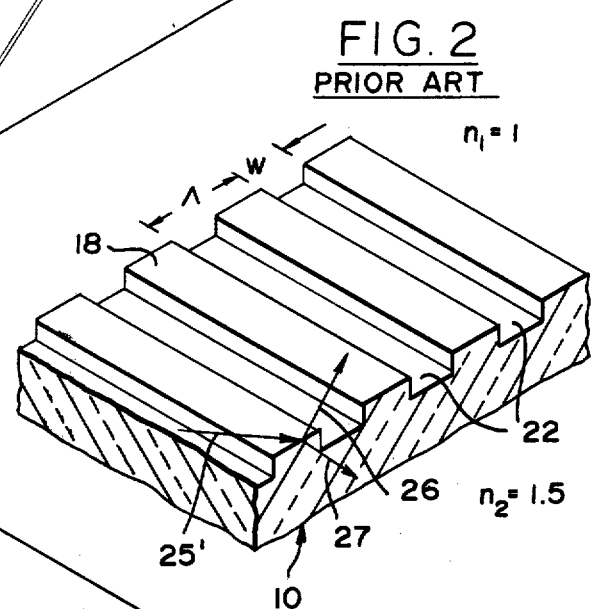
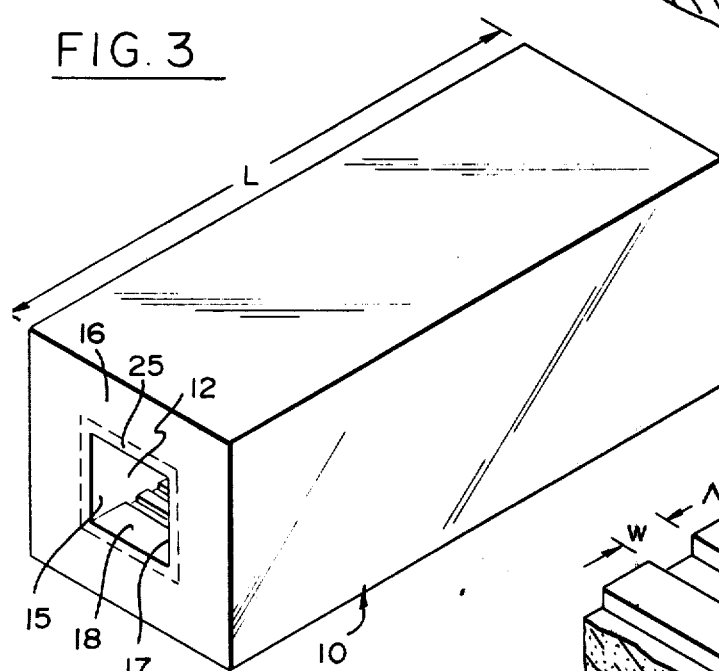
FIG. 3
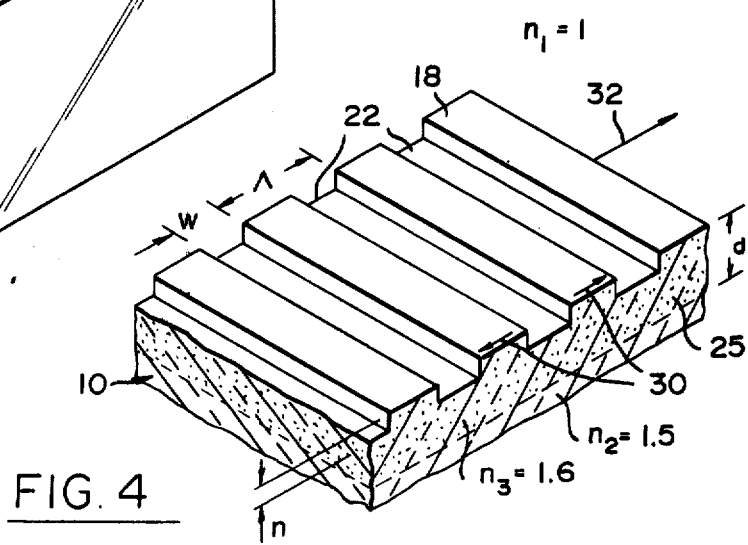
FIG. 4

3,939,439

DIFFUSED WAVEGUIDING CAPILLARY TUBE WITH DISTRIBUTED FEEDBACK FOR A GAS LASER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to gas lasers and, more particularly, to a new tube structure for a mirrorless gas laser.

2. Description of the Prior Art

In a conventional waveguide gas laser, a capillary tube with a hollow opening through which a laser active gas is made to propagate at high pressure is used. End mirrors are employed to reflect the energy back and forth through the opening to achieve the desired amplification and the lasing action. As is known, these mirrors reduce the overall gain and increase the laser complexity and maintenance since the mirrors have to be aligned very precisely, and are subject to damage, requiring periodic replacement.

In recent years, mirrorless distributed feedback lasers have been proposed and described in the literature. In such lasers, distributed feedback, which eliminates the need for the mirrors, is achieved by providing a periodically corrugated surface along the length of the amplifying medium. Distributed feedback is achieved when the corrugation periodicity is a function of the desired wavelength of emission.

In a recent article by Dietrich Marcuse, entitled "Hollow Dielectric Waveguides for Distributed Feedback Lasers", IEEE Journal of Quantum Electronics, Volume QE-8 No. 7, July 1972, page 661, the performance of a dielectric capillary tube with a hollow opening that fulfills the dual role of a guidance structure for the gas laser and provides distributed feedback so as to eliminate the need for the external mirrors is analyzed. The feedback is achieved by means of periodic ripples or corrugation of the inner surface of the hollow opening of the tube. In the article it is recognized that some waves propagating in the tube opening will strike the tube inner surface. Since the tube has a higher index of refraction than that in the opening (which can be assumed to be equal to one), some of the energy of the waves striking the opening inner surface will be transmitted through the tube wall, resulting in lower efficiency which is most undesirable. However, in the article based on theoretical analysis, it is contended that despite these losses the tube with the corrugated opening which produces the distributed feedback is still more efficient than the conventional tube requiring the use of external mirrors.

OBJECTS AND SUMMARY OF THE INVENTION

It is an object of the present invention to provide an improved tube structure for a mirrorless gas laser.

Another object of the invention is to provide a tube structure for a mirrorless gas laser in which the distributed feedback is achieved without the energy losses characterizing the prior art.

These and other objects of the invention are achieved by providing a tube with a hollow opening with a periodically corrugated inner surface to produce the desired distributed feedback. The tube's region surrounding the opening is diffused to produce a diffused region around the opening whose index of refraction is higher than the rest of the tube. Thus, the diffused region acts as a waveguide confining all the energy waves to travel therein. The evanescent component of the energy wave at the corrugated surface interacts with the high pressure gas in the opening absorbing energy therefrom to attain the energy amplification which is finally emitted out of the diffused region.

The novel features of the invention are set forth with particularity in the appended claims. The invention will best be understood from the following description when read in conjunction with the accompanying drawings.

BRIEF DESCRIPTION OF THE DRAWINGS

FIGS. 1 and 2 are diagrams useful in describing the prior art capillary tube with a corrugated surface;

FIGS. 3 and 4 are diagrams useful in explaining the improved tube in accordance with the present invention;

DESCRIPTION OF THE PREFERRED EMBODIMENTS

Figure 5:
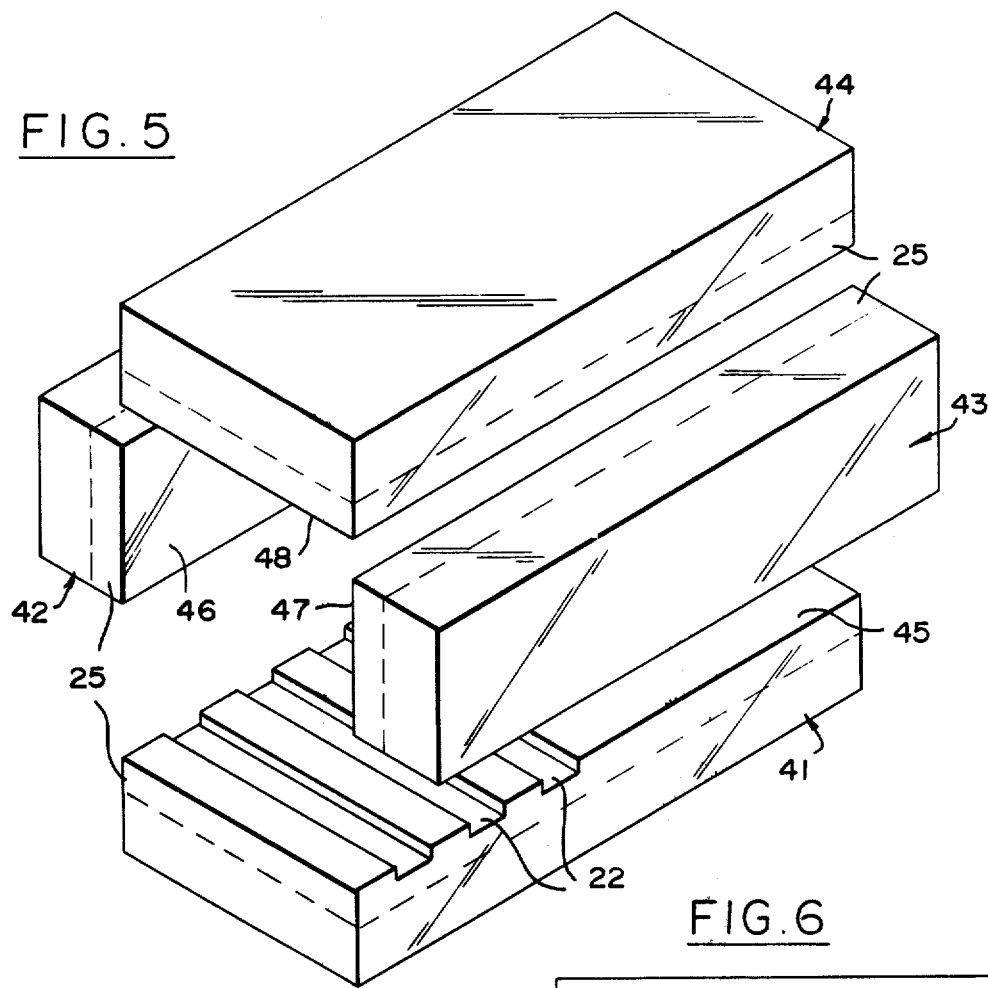
FIGS. 5 and 6 are diagrams of one embodiment of the invention and the manner of fabricating it.

Attention is first directed to FIGS. 1 and 2 in connection with which the prior art of waveguide gas lasers and its advantages and disadvantages will first be discussed. FIG. 1 is an isometric view of a capillary tube structure or simply tube 10 of a length L with a hollow opening 12 extending therethrough. For explanatory purposes, opening 12 is shown as a rectangular opening, defined by inner walls or surfaces 15–18 which together define the inner surface of the opening. The opening provides a path for an active laser gas, e.g., $CO_2$ at a high pressure. Such tubes made of a dielectric material, such as glass or ceramic, are quite conventional in any gas laser utilizing end mirrors.

If one of the surfaces defining the opening 12, such as surface 18 is properly corrugated along its length as shown in FIG. 2, distributed feedback is achieved and therefore the end mirrors can be eliminated. Surface 18, can be corrugated by machining or milling channels 22 therein. The channel periodicity is designated as $\Lambda$. For proper distributed feedback to occur, $\Lambda = n(\lambda/2)$, where $n$ is an integer and $\lambda$ is the wavelength of emission of the particular gas. For $CO_2$, $\lambda = 10.2\mu$ and therefore $\Lambda$ should be $5.1\mu$. The distributed energy feedback eliminates the need for the external mirrors. Thus, tube 10 with corrugated surface 18 can be used without the mirrors to serve as the gas laser amplifying structure.

One of the major disadvantages, which was recognized in the prior art, is that in such a tube significant losses occur due to the transmission of energy through the tube material, thereby resulting in reduced efficiency. Some of the energy waves which travel back and forth in the opening 12, due to the distributed feedback, strike the corrugated surface 18 as well as the other surfaces 15–17.

Since the index of refraction of the tube material is greater than that in the opening some of the energy of the wave striking one of the surfaces forming the opening inner surface is transmitted through the tube material. The index of refraction in the opening 12 designated $n_1$ can be assumed to be equal to 1 ($n_1=1$), while the index of refraction of the tube material designated $n_2$ is always greater than 1. For glass or ceramic it can be assumed that $n_2 = 1.5$.

Thus, since $n_2 > n_1$, when the wave 25 travelling in the opening 12 strikes any of the surfaces 15–18, e.g., surface 18, part of it, designated by 26, is reflected back into the opening while a portion of it designated 27 is transmitted through the tube material. The energy of the transmitted wave 27 reduces the gain of the system. This gain reduction or loss is recognized in prior art theoretical analysis, including the above-referred to Marcuse article. However, therein, it is contended that despite such a gain reduction the tube with the corrugated surface in the opening is more efficient, i.e., is capable of higher gain than that realizable with a conventional tube with external mirrors.

The present invention is directed to an improved tube with a corrugated opening and one in which the losses, due to waves transmitted through the tube material, are practically eliminated. In accordance with the present invention the region of the tube material surrounding the opening 12 has a higher index of refraction than the rest of the tube material beyond that region. Thus, this region serves as a waveguide for the waves which propagate back and forth due to the distributed feedback provided by the corrugated surface, thereby eliminating the losses inherent in the prior art tubes.

In accordance with the present invention as shown in FIGS. 3 and 4, the opening 12 is surrounded by a region 25 with an index of refraction $n_3$ which is greater than the index of refraction $n_2 = 1.5$ of the tube material. This may be achieved by infusing into the tube material gas or metal molecules so as to produce diffused region 25 to a selected depth designated $d$, with $n_3 > n_2$.

For explanatory purposes, let $n_3 = 1.6$. Since the indices of refraction above and below the diffused region 25 are less than $n_3$, since $n_1 = 1$ in the opening 12 and $n_2 = 1.5$, the diffused region acts as an excellent waveguide. The depth $d$ of the diffused region is generally limited, in order to confine the wave propagation to take place near the channels 22 which produce the distributed feedback. In practice the depth $d$ should preferably be not less than 1$\lambda$ and preferably on the order of 3$\lambda$. As is appreciated by those familiar with the art the waves travelling in the diffused region 25 which act as the waveguide include a wave component, known as the evanescent component, which in the present invention, though guided in the diffused region extends into the opening 12. This component which decays exponentially from the diffused region outer surface is designated in FIG. 4 by numeral 30. Since it extends into the opening 12, though for all practical purposes it is guided by the diffused region 25, it interacts with the laser gas in the opening and thereby gains energy therefrom. Thus, the waves travelling in the diffused region are amplified and finally exit the diffused region as beam 32. It should be pointed out that the waves are guided in the entire diffused region surrounding the opening 12 even though the channels 22 providing the distributed feedback, are only on surface 18 of the opening. In the present invention, the beam exits the diffused region surrounding the opening 12 rather than through the opening 12. In practice however, the opening cross-sectional dimension is very small, on the order of 1$\lambda$ to 7$\lambda$.

The depth of each channel, designated $\eta$, is not very critical. It can be less as well as more than 1$\mu$. From a fabrication or machining point of view the channel depth is limited by the channel with $w$, which is generally in the micron range. The channel width $w$ may be equal to $\Lambda/2$ although it is not limited thereto, as long as the channel periodicity $\Lambda$ is equal to ½$\lambda$.

It should be pointed out that for proper operation of the novel tube of the invention the entire region surrounding opening 12 has to have a higher index of refraction than the rest of the tube material in order to serve as the waveguide. However, the corrugations 22 need not be on the entire inner surface of the opening. As previously shown, the corrugations (channels 22) are only on surface 18. If desired, the corrugations can be on one or more of the other sides 15–17. It should however be pointed out that in such a case, the channels on the different sides must be accurately aligned with one another along the length L of the tube 10.

The tube with the rectangular opening 10 as shown in FIG. 3 can be easily fabricated by first diffusing four pieces of glass or the like designated by numerals 41–44 in FIG. 5 to the desired depth $d$ through their respective surfaces 45–48, to form in each a diffused region 25.

Figure 6:
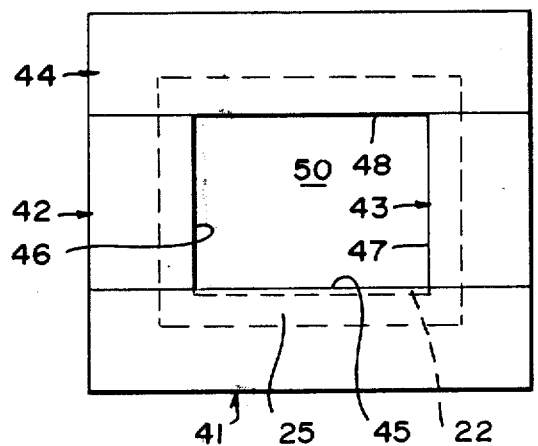

Thereafter, channels 22 are milled in block 41 to corrugate surface 45. Thereafter, blocks 42 and 43 may be aligned on surface 41 and block 44 placed thereon. After fusing the four blocks to form an integral unit, surfaces 45–48 would define the inner surface of a rectangular opening 50 as shown in FIG. 6.

Figure 7:
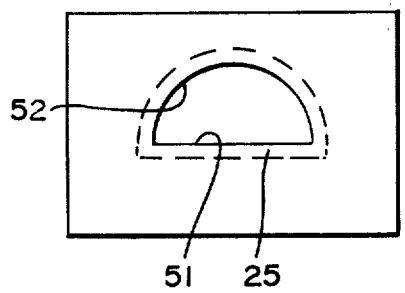
FIG. 7 is an end view of an embodiment of the invention with a semi-circular opening.

It should be pointed out that the novel tube is not limited to one with a rectangular opening. It may have a circular opening with spaced apart channels over the entire inner circumference. Similarly, it may consist of an opening with a semicircular cross section as shown in FIG. 7 in which the channels may be on the flat surface 51 and/or the semicircular surface 52, as long as the entire opening is surrounded by a diffused region 25 of an index of refraction which is greater than that of the rest of the tube material so as to confine wave propagation in the diffused region which acts as the waveguide.

It should further be pointed out that the index of refraction of the diffused region 25 need not be uniform across its depth, the diffusion may be controlled to vary the index of refraction exponentially from a higher value at the exposed surface to the value of the tube material at the deepest point of the diffused region. Thus, in such a case, the tube can be viewed as an exponentially inhomogenous tube with a hollow opening in which the index of refraction varies exponentially from a value at the opening inner surface to a lower value at a selected depth from said inner surface.

Figure 8:
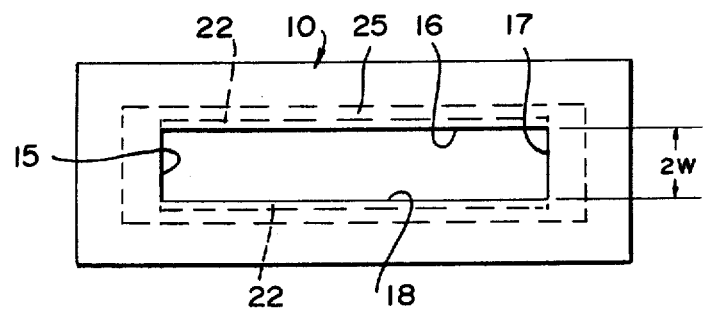
FIG. 8 is an end view of an embodiment with corrugations on two opposite surfaces forming the tube opening.
Figure 9:
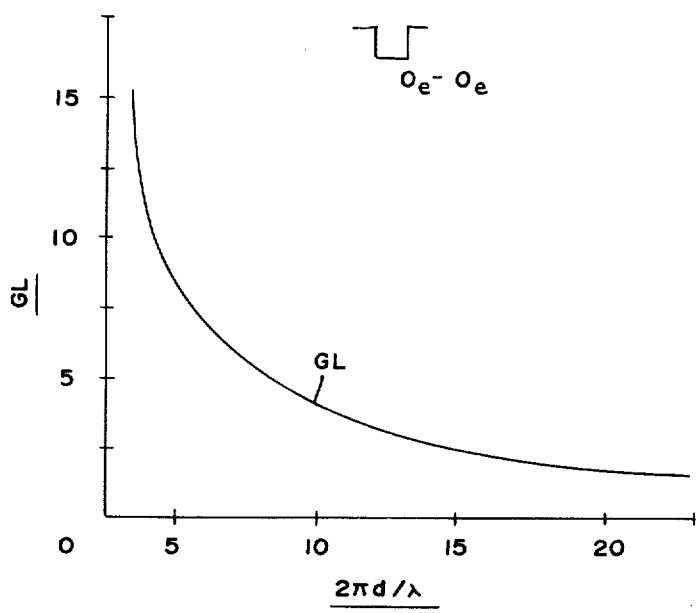
FIGS. 9 and 10 are graphs of calculation results for tubes with different openings.

Calculations were performed for a rectangular opening, such as shown in FIG. 8, except that channels were assumed to be present in the opposite surfaces 16 and 18 spaced apart a distance 2W for 0 (even) - 0 (even) mode coupling with W/$d$ = 0.3, L/$d$ = 5000, $n$/W = 0.05 and a diffused region 25 with the index of refraction $n_3$ varying exponentially from 1.6 at the surfaces of the opening 12 to 1.5 at the depth $d$. The dimension between uncorrugated surfaces 15 and 17 was assumed to be very large as compared with 2W and therefore was ignored in the calculations. The results of the calculations are summarized in FIG. 9 in graph form, where the abscissa is in terms of $2\pi d/\lambda$ and the ordinate in terms of the gain (GL) of the active material (laser gas) in the opening 12. As seen therefrom the required gain of the laser gas to be used decreases with increased diffused region depth. For example, when $2\pi d/\lambda$ is equal to 15 the required gain (GL) of the laser gas is on the order of 2.5. As the diffused region decreases, i.e., $2\pi d/\lambda$ decreases, high laser gas gain is required.

Figure 10:
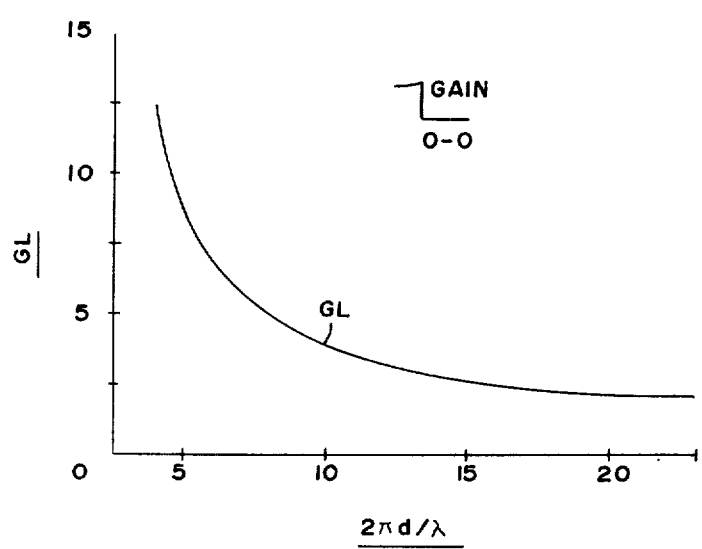

Calculations were also performed for an opening 12 such as the one shown in FIGS. 3 and 4 in which the corrugations are only one on a side or surface, such as surface 18. The results are shown in graph form in FIG. 10. Therefrom, it should be apparent that if only one surface is corrugated rather than two surfaces, for the same conditions a laser gas with a slightly higher gain factor is required. However, the difference is not great.

The present invention can therefore be summarized as consisting of an elongated tube structure with an inner surface defining an elongated capillary opening extending from one side of the tube to the opposite side. The tube has to be of sufficient thickness to withstand the high pressure of the laser gas flowing in the opening. At least a portion of the inner surface of the tube, which defines the opening, is corrugated along the opening length with corrugations or channels with a periodicity $\Lambda$ where $\Lambda = \frac{1}{2}\lambda$. $\lambda$ designates the laser gas wavelength. The index of refraction $n_1$ in the opening containing the gas can be assumed to be equal to 1. The tube material which is generally glass or a ceramic has an index of refraction $n_2$ on the order of 1.5. The tube includes a diffused region 25 surrounding the opening and extending outwardly from the opening inner surface to a desired depth $d$. The diffused region acts as a waveguide for waves propagating therein, while the channels on the corrugated surface produce distributed feedback to thereby eliminate the need for external mirrors. The cross-sectional dimension of the opening from the corrugated inner surface to the opposite surface is in the micron range, generally between $1\lambda$ and $7\lambda$. The evanescent component of the waves, travelling in the diffused region, which serves as the waveguide, interact with the laser gas in the opening thereby gaining energy therefrom and amplifying the waves travelling in the diffused region, which exit as a beam therefrom. The opening cross-section may be circular, rectangular or of any other desired shape to simplify the formation of the channels over the entire inner surface, defining the opening, or any portion thereof.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. For use in a waveguide gas laser, a tube structure comprising:

an elongated capillary tube having an outer surface extending from a first end to a second opposite end of said tube, said tube further having an inner surface, defining an elongated opening extending between said ends, at least a portion of said inner surface defining corrugations along the length of said opening with a periodicity $\Lambda$, where $\Lambda$ is equal to one half of a selected wavelength $\lambda$, said tube being of a material with an index of refraction definable as $n_2$, said tube further including a diffused region surrounding said opening with an index of refraction, definable as $n_3$, where $n_3 > n_2$, the depth of said diffused region around said opening, definable as $d$, being less than the thickness of said tube between its outer and inner surfaces.

2. The tube as described in claim 1 wherein the index of refraction $n_3$ of said diffused region decreases from a first value at said inner surface, defining said opening, to a lower value at the depth $d$ from said inner surface.

3. The tube as described in claim 1 wherein the depth of the diffused region $d$ is not less than $1\lambda$.

4. The tube as described in claim 3 wherein the depth of the diffused region $d$ is on the order of $3\lambda$.

5. The tube as described in claim 4 wherein the index of refraction $n_3$ of said diffused region is on the order of $n_2 + 0.1$ at substantially the inner surface defining said opening and decreases to a value substantially equal but not less than $n_2$ at the depth $d$.

6. The tube as described in claim 1 wherein at least two opposite portions of the inner surface, defining said opening, are corrugated with the corrugations on the two opposite portions of said inner surface, the corrugations being aligned along the length of said opening.

7. The tube as described in claim 6 wherein the depth of the diffused region is not less than $1\lambda$ and up to about $3\lambda$, and the distance between the two corrugated opposite portions of said inner surface is on the order of $1\lambda$ to $7\lambda$.

8. The tube as described in claim 7 wherein the index of refraction $n_3$ of said diffused region is on the order of $n_2 + 0.1$ at substantially the inner surface, defining said opening, and decreases to a value substantially equal but not less than $n_2$ at the depth $d$.

9. The tube as described in claim 6 wherein said opening is characterized by a rectangular cross-section in a direction perpendicular to its length with the corrugated opposite sides forming two opposite sides of the rectangular opening.

10. The tube as described in claim 9 wherein the depth of the diffused region is not less than $1\lambda$ and up to about $3\lambda$, and the distance between the two corrugated opposite portions of said inner surface is on the order of $1\lambda$ to $7\lambda$.

11. The tube as described in claim 10 wherein the index of refraction $n_3$ of said diffused region is on the order of $n_2 + 0.1$ at substantially the inner surface defining said opening and decreases to a value substantially equal but not less than $n_2$ at the depth $d$.

12. In a gas laser of the type including a capillary tube defining an elongated capillary opening formed by an inner surface of said tube, said opening providing a path for the gas which lases therein to provide a laser beam at a wavelength $\lambda$, the tube being characterized with at least a portion of the inner surface being corrugated by corrugations with a periodicity $\Lambda$, where $2\Lambda = q\lambda$, $q$ being an integer to provide distributed feedback in said tube, the tube material being characterized by an index of refraction definable as $n_2$ with the index of refraction in said opening being definable as $n_1 = 1$, the improvement comprising:

a diffused region in said tube surrounding said opening and extending to a depth $d$ therefrom, the diffused region index of refraction being $n_3$ which is greater than the index of refraction of the tube material, $n_2$, which extends beyond the diffused region to the tube's outer surface, said diffused region serving as a waveguide for waves guided therein, with the evanescent component of said waves interacting with the lasing gas in said opening, gaining energy therefrom to amplify the waves travelling in said diffused region.

13. The tube as described in claim 12 wherein the index of refraction $n_3$ of said diffused region decreases from a first value at the tube's inner surface which is greater than $n_2$ to a value which is substantially equal but not less than $n_2$ at the depth $d$ of said diffused region.

14. The tube as described in claim 13 wherein the diffusion depth $d$ is not less than $1\lambda$, the opening is a rectangular opening with the corrugation, producing said distributed feedback, being on at least one side of said rectangular opening.

15. The tube as described in claim 14 wherein two opposite sides of said rectangular opening are corrugated with the distance between said two opposite corrugated surfces being on the order of not less than $1\lambda$.

16. The tube as described in claim 15 wherein the diffused region depth is on the order of $3\lambda$.

17. The tube as described in claim 16 wherein the distance between the two opposite corrugated surfaces is on the order of $1\lambda$ to $7\lambda$.

* * * * *